us009197725B2

(12) United States Patent
Toh

(10) Patent No.: US 9,197,725 B2
(45) Date of Patent: Nov. 24, 2015

(54) CRADLE DEVICE HAVING EXCELLENT USABILITY AND RELIABILITY AND SIMPLE STRUCTURE AND DESK TELEPHONE HAVING THE SAME DEVICE

(71) Applicant: NEC PLATFORMS, LTD., Kawasaki-shi, Kanagawa (JP)

(72) Inventor: Tadamine Toh, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/420,931

(22) PCT Filed: Sep. 4, 2013

(86) PCT No.: PCT/JP2013/074444
§ 371 (c)(1),
(2) Date: Feb. 11, 2015

(87) PCT Pub. No.: WO2014/050548
PCT Pub. Date: Apr. 3, 2014

(65) Prior Publication Data
US 2015/0222737 A1    Aug. 6, 2015

(30) Foreign Application Priority Data

Sep. 26, 2012   (JP) ................................. 2012-212075

(51) Int. Cl.
*H04M 1/00*  (2006.01)
*H04M 1/11*  (2006.01)

(52) U.S. Cl.
CPC ...................................... *H04M 1/11* (2013.01)

(58) Field of Classification Search
None
See application file for complete search history.

(56) References Cited

U.S. PATENT DOCUMENTS

| 5,828,966 | A | * | 10/1998 | Davis et al. ................... 455/573 |
| 6,130,521 | A | * | 10/2000 | Collins et al. ................. 320/115 |
| 6,716,058 | B2 | * | 4/2004 | Youn .............................. 439/535 |
| 7,014,486 | B1 | | 3/2006 | Wu et al. |

(Continued)

FOREIGN PATENT DOCUMENTS

| CN | 101436872 A | 5/2009 |
| CN | 103259893 A | 8/2013 |

(Continued)

OTHER PUBLICATIONS

Decision of Rejection for Japanese Patent Application No. 2012-212075, dated May 28, 2014.

(Continued)

*Primary Examiner* — Tuan D Nguyen
(74) *Attorney, Agent, or Firm* — Sughrue Mion, PLLC

(57) ABSTRACT

A cradle device according to this invention includes a body (11) and a battery-charging cover (12). An upper end of the battery-charging cover (12) supports a lower end of a portable information terminal (40) to be held on a main mounting surface (11a). The body (11) further includes ribs (30) arranged at a lower end of the main mounting surface (11a). The ribs (30) relatively project from the upper end of the battery-charging cover (12) gradually along with a forward rotation of the battery-charging cover (12) so that the portable information terminal (40) is gradually raised from the upper end of the battery-charging cover (12). In this way, a plug connector (17) of the cradle device is extracted from a receptacle connector (401) of the portable information terminal (40) in a fitting direction without any load in a different direction.

6 Claims, 9 Drawing Sheets

(56) References Cited

U.S. PATENT DOCUMENTS

| | | | |
|---|---|---|---|
| 7,929,291 | B2 | 4/2011 | Park et al. |
| 8,113,873 | B1 | 2/2012 | Sarraf |
| 2008/0108395 | A1* | 5/2008 | Lee et al. ............... 455/572 |
| 2009/0129010 | A1 | 5/2009 | Park et al. |
| 2009/0168312 | A1 | 7/2009 | Motoe et al. |
| 2013/0217448 | A1 | 8/2013 | Kim et al. |

FOREIGN PATENT DOCUMENTS

| | | |
|---|---|---|
| JP | 7-183065 A | 7/1995 |
| JP | 8-171959 A | 7/1996 |
| JP | 2001-217036 A | 8/2001 |
| JP | 2001-265465 A | 9/2001 |
| JP | 2003-229208 A | 8/2003 |
| JP | 2004-259595 A | 9/2004 |
| JP | 2005-12576 A | 1/2005 |
| JP | 2005-208704 A | 8/2005 |
| JP | 2009-157570 A | 7/2009 |
| WO | 2013/047539 A1 | 4/2013 |
| WO | 2013/061796 A1 | 5/2013 |
| WO | 2013/061797 A1 | 5/2013 |

OTHER PUBLICATIONS

International Search Report of PCT/JP2013/074444, dated Oct. 22, 2013. [PCT/ISA/210].

Communication dated Jul. 30, 2015 from the State Intellectual Property Office of the P.R.C. In counterpart application No. 201380044574.2.

* cited by examiner

CRADLE DEVICE HAVING EXCELLENT USABILITY AND RELIABILITY AND SIMPLE STRUCTURE AND DESK TELEPHONE HAVING THE SAME DEVICE

CROSS REFERENCE TO RELATED APPLICATIONS

This application is a National Stage of International Application No. PCT/JP2013/074444 filed Sep. 4, 2013, claiming priority based on Japanese Patent Application No. 2012-212075, filed Sep. 26, 2012, the contents of all of which are incorporated herein by reference in their entirety.

TECHNICAL FIELD

This invention relates to a cradle device configured to removably support a portable information terminal such as a tablet terminal or a smartphone, and to relay electrical connection between the portable information terminal and other devices.

BACKGROUND ART

Nowadays, various portable information terminals such as a tablet terminal (multifunction portable terminal) and a smartphone (highly functional mobile phone) are put on the market. An iPad (unregistered or registered trademark) is known as a typical example of the tablet terminal (multifunction portable terminal), and an iPhone (unregistered or registered trademark) is known as a typical example of the smartphone (highly functional mobile phone).

As is well known, a battery charger is often provided to each portable information terminal as an auxiliary part. The battery charger includes a battery-charging plug connector, which is fixed to one end portion of a power supply cable, and an adapter (transformer) including a plug, which is fixed to the other end portion of the power supply cable. When the portable information terminal is charged, in general, the plug of the adapter including a plug is inserted into a power outlet socket of a commercial power supply and the like, and the plug connector is inserted into a battery-charging receptacle connector formed in a lower end of the portable information terminal. Thus, a secondary battery (such as a lithium ion battery) built into the portable information terminal can be charged. Note that, in addition to the battery charging purpose, the receptacle connector and the plug connector are sometimes used as an interface through which data is input and output between the portable information terminal and other devices.

On the other hand, hitherto, various cradle devices (holding bases, battery-charging bases) capable of charging those portable information terminals while supporting or holding the portable information terminals on the cradle devices have been proposed.

For example, in Patent Document 1, there is disclosed a cradle device for holding a portable information terminal in a freely removable manner. The cradle device disclosed in Patent Document 1 includes an abutment surface for supporting a bottom portion of the portable information terminal, and a back plate for supporting a back portion thereof. A receptacle connector including a recessed portion and a protruding portion with an electrode formed in the recessed portion is formed at the bottom portion of the portable information terminal. The electrode of the receptacle connector is brought into contact with a contact point of a connector (plug connector) protruding from the abutment surface of the cradle device to be electrically connected thereto. This cradle device guides downward slide of the portable information terminal under its own weight by the back plate, and the plug connector is fitted into the receptacle connector when the bottom portion of the portable information terminal is supported by the abutment surface, to thereby perform electrical connection. Then, the portable information terminal is supplied with electric power to be charged.

In Patent Document 2, there is also disclosed a cradle device for holding a portable information terminal in a freely removable manner. The cradle device disclosed in Patent Document 2 includes a bottom wall for supporting a bottom portion of the portable information terminal, a back wall for supporting a back portion thereof, and right and left side walls for guiding side portions thereof when the portable information terminal is mounted on the cradle device. An engagement hole and a receptacle connector are formed at the bottom portion of the portable information terminal. On the other hand, a first opening and a second opening are formed in the bottom wall of a holding base on the left side and the right side, respectively. This cradle device further includes a hook that protrudes through the first opening of the bottom wall and rotates in such a manner that the hook can be engaged with the engagement hole of the portable information terminal, and a plug connector that protrudes through the second opening of the bottom wall and is supported by an elastic member. This cradle device, which also guides downward slide of the portable information terminal under its own weight by the back wall and the side walls and supports the bottom portion of the portable information terminal by the abutment surface, holds the portable information terminal with the hook. At this time, the plug connector is fitted into the receptacle connector to perform electrical connection. Then, the portable information terminal is supplied with electric power to be charged.

Further, the applicant of this invention also proposes a cradle device. This cradle device includes a body for holding a portable information terminal by a main mounting surface inclined with respect to a horizontal surface, and a battery-charging cover that includes a housing section capable of housing a plug connector and is removably fixed to a lower end of the main mounting surface. The battery-charging cover supports the lower end of the portable information terminal held on the main mounting surface, and is rotatable about pivots arranged at a lower end portion of the battery-charging cover. When the portable information terminal is mounted on or removed from this cradle device, the portable information terminal to be held or being held on the cradle device in a posture inclined backward rotates forward together with the battery-charging cover so that the portable information terminal is easily mounted on or removed from the cradle device.

Note that, although not relating to a cradle device, in Patent Documents 3 and 4, there are disclosed plug devices capable of being fitted into an outlet socket of a commercial power supply. Those plug devices each include a grip portion and a plug terminal that is rotatably fixed to a casing at one end of the grip portion and is to be connected to a receptacle terminal of the outlet socket. A protruding portion is formed on a side surface of the casing on one end side. When the plug device fitted into the outlet socket is to be extracted (removed), the casing is rotationally operated with a fulcrum that is a contact point between a surface of the outlet socket and the protruding portion so that the plug terminal of the plug device can be extracted from the receptacle terminal of the outlet socket with small operation force due to the principle of leverage. Note that, in the plug device disclosed in Patent Document 4, the protruding portion is used also when the plug device is to be fitted into the outlet socket so that the contact point between the surface of the outlet socket and the protruding portion serves as a fulcrum. Thus, the plug terminal of the plug device can be inserted into the receptacle terminal of the outlet socket with small operation force.

PRIOR ART DOCUMENTS

Patent Document

Patent Document 1: JP-A-2005-208704
Patent Document 2: JP-A-2009-157570
Patent Document 3: JP-A-H08-171959
Patent Document 4: JP-A-2004-259595

SUMMARY OF THE INVENTION

Problems to be Solved by the Invention

When each of the related-art cradle devices including the cradle devices disclosed in Patent Documents 1 and 2 as well as the cradle device proposed by the applicant of this invention holds a portable information terminal, the plug connector of the cradle device is fitted into a receptacle connector of the portable information terminal with predetermined fitting force. In addition, in order to securely maintain the fitted state, there may be provided a latch structure including a recessed portion formed in the receptacle connector and a claw urged by a spring arranged in the plug connector. Therefore, when the portable information terminal is to be removed from the cradle device, a user needs, while holding the cradle device by one hand as necessary, to grip and pull the portable information terminal by the other hand as moving the portable information terminal from side to side with force stronger than the fitting force. Thus, those cradle devices have poor usability. Further, when the portable information terminal is to be removed from the cradle device by those operations, a load (stress) in a direction different from a connector fitting direction is applied, and hence there is a fear that the receptacle connector and the plug connector are deformed and damaged.

Note that, in the cradle device disclosed in Patent Document 2, the elastic member for supporting the plug connector absorbs the load in the different direction to some extent. However, the structure of supporting the plug connector by the elastic member is complicated and expensive. In addition, the elastic member may be deformed due to long term use, removal of many times, or use under a high-temperature environment. If the elastic member is deformed, a position of the plug connector is displaced from a correct position, and hence there is a fear that the plug connector is not normally fitted into the receptacle connector when the portable information terminal is mounted on the cradle device.

Therefore, it is an object of this invention to provide a cradle device having excellent usability, high reliability of electrical connection, and a simple structure.

Means to Solve the Problems

According to one embodiment of this invention, there is provided a cradle device configured to removably support a portable information terminal including a receptacle connector formed in a lower end thereof, and to allow fitting between the receptacle connector of the supported portable information terminal and a plug connector to be fitted into the receptacle connector, the cradle device including: a body including a main mounting surface inclined backward on an upper side thereof to support a back surface of the portable information terminal; and a battery-charging cover configured to house the plug connector so that a tip of the plug connector protrudes from an upper end of the battery-charging cover, and to be rotatable forward about pivots arranged at a lower end of the main mounting surface, the upper end of the battery-charging cover being configured to support the lower end of the portable information terminal to be held on the main mounting surface, the plug connector being configured to be fitted into the receptacle connector in a fitting direction when the lower end of the portable information terminal is supported by the upper end of the battery-charging cover, the body further including ribs arranged at the lower end of the main mounting surface, the ribs being configured to relatively project from the upper end of the battery-charging cover gradually along with the forward rotation of the battery-charging cover so that the portable information terminal is gradually raised from the upper end of the battery-charging cover, to thereby extract the plug connector from the receptacle connector in the fitting direction.

The ribs may include a pair of rib pieces arranged at the lower end of the main mounting surface at positions corresponding to both sides of the plug connector.

The pivots may include a pair of columnar protrusions that is arranged on both sides of the battery-charging cover and is to be fitted into a pair of U-shaped grooves formed in the body.

The battery-charging cover may include a stopper configured to limit, in cooperation with the body, a range of rotation of the battery-charging cover about the pivots to a range within a predetermined angle.

The cradle device may further include an urging mechanism configured to urge the battery-charging cover so that a back surface of the battery-charging cover returns to an initial position in contact with the main mounting surface.

Further, according to one embodiment of this invention, there is provided a desk telephone including: the above-mentioned cradle device; and a handset arranged on a side portion of the body.

Effect of the Invention

The cradle device according to the one embodiment of this invention has excellent usability, high reliability of electrical connection, and a simple structure.

MODE FOR EMBODYING THE INVENTION

A cradle device according to this invention includes a body having a main mounting surface inclined backward on an upper side thereof to support a back surface of a portable information terminal, and a battery-charging cover configured to house a plug connector so that a tip of the plug connector protrudes from an upper end of the battery-charging cover, and to be rotatable forward about pivots arranged at a lower end of the main mounting surface. The upper end of the battery-charging cover is configured to support a lower end of the portable information terminal to be held on the main mounting surface. When the lower end of the portable information terminal is supported by the upper end of the battery-charging cover, the plug connector is fitted into a receptacle connector in a fitting direction.

In particular, in this cradle device, the body includes ribs arranged at the lower end of the main mounting surface. The ribs relatively project from the upper end of the battery-charging cover gradually along with the forward rotation of the battery-charging cover through an operation by a user. As a result, the portable information terminal is gradually raised from the upper end of the battery-charging cover. In this way, the plug connector is extracted (removed) from the receptacle connector in the fitting direction.

With the above-mentioned configuration, this cradle device has excellent usability, high reliability of electrical connection, and a simple structure.

More specifically, when the portable information terminal supported by this cradle device is removed, the plug connector is automatically extracted from the receptacle connector in the fitting direction along with the rotation of the battery-charging cover through the operation by the user. Therefore, the user needs not to perform work involving holding down the cradle device on a desk or the like, and gripping and pulling the portable information terminal while moving the portable information terminal from side to side. Thus, this cradle device has excellent usability.

Further, the plug connector is extracted from the receptacle connector in the fitting direction, and hence a load (stress) in a direction different from the connector fitting direction is not applied on the plug connector and the receptacle connector.

Therefore, there is no fear that the receptacle connector and the plug connector are deformed and damaged. Thus, this cradle device has high reliability of electrical connection.

In addition, this cradle device has the structure in which only the ribs are added to the cradle device including the rotatable battery-charging cover without the need to provide a spring and an additional rotational component. Thus, this cradle device has a simple structure.

Now, a cradle device according to a specific embodiment of this invention is described with reference to the drawings.

Embodiment

Figure 1:
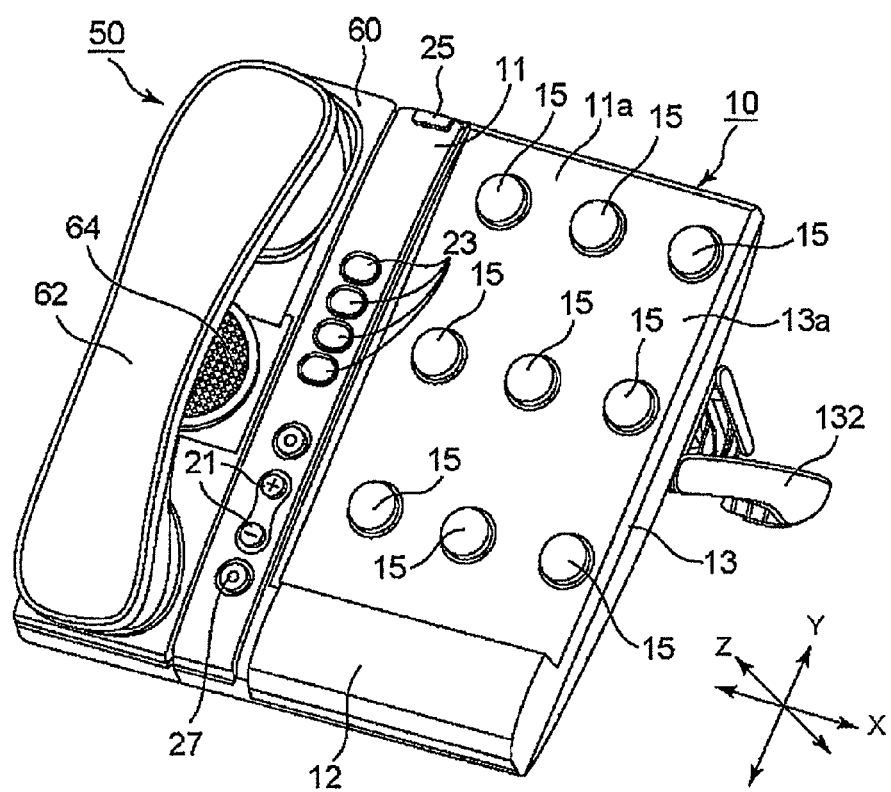
FIG. 1 is a perspective view illustrating a cradle device according to an embodiment of this invention under a state in which a side plate is removed.
Figure 2:
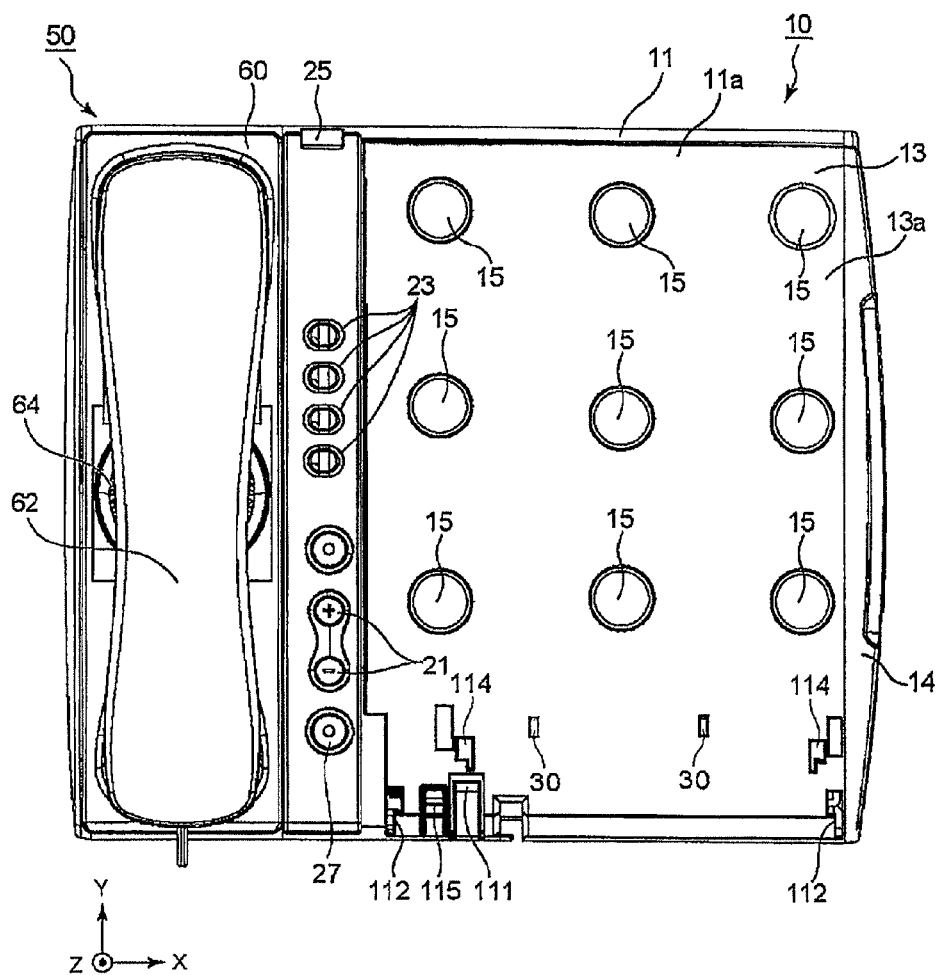
FIG. 2 is a plan view illustrating the cradle device illustrated in FIG. 1 under a state in which a battery-charging cover is removed.
Figure 3:
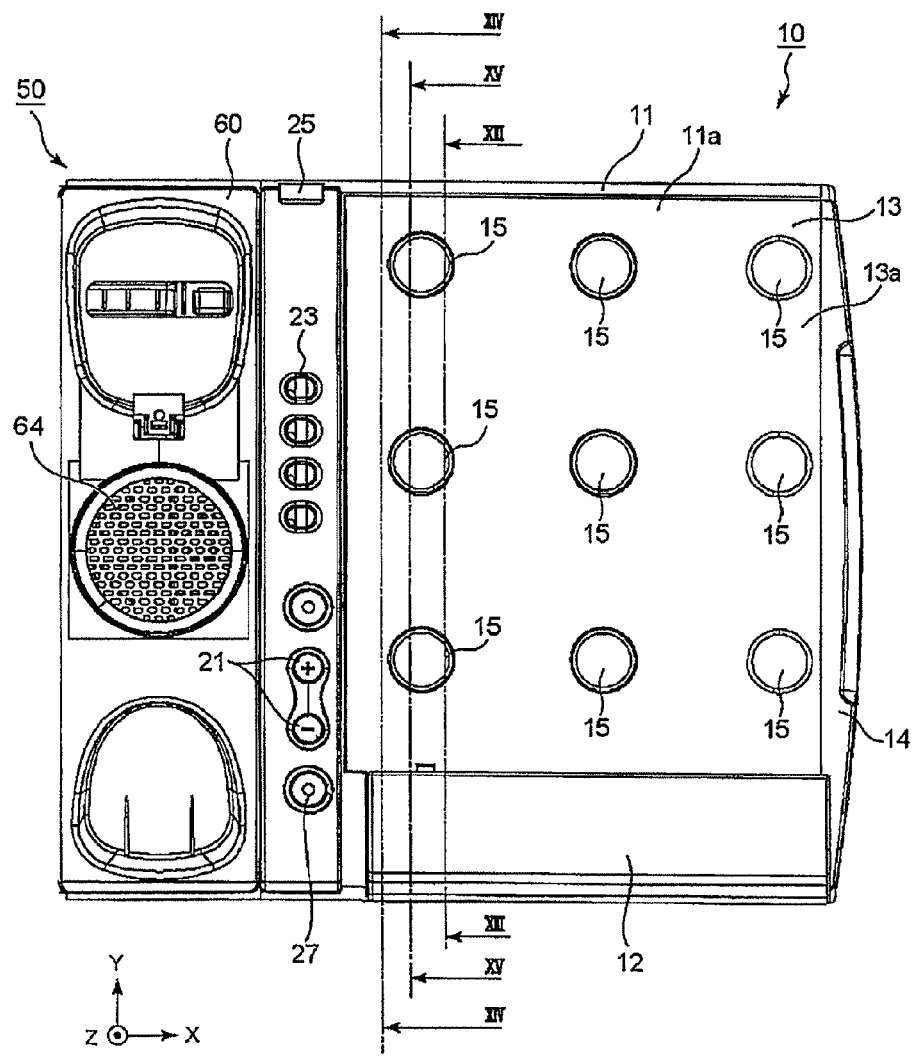
FIG. 3 is a plan view illustrating the cradle device illustrated in FIG. 1 under a state in which a handset is removed.

Referring to FIG. 1 to FIG. 3, a cradle device 10 according to an embodiment of this invention includes a body 11 having a main mounting surface 11*a* inclined at a predetermined angle with respect to a horizontal surface such as a desk surface. The body 11 includes, on a rear surface thereof, a leg 132 for supporting the body 11. Therefore, the leg 132 allows the main mounting surface 11*a* to be inclined at the predetermined angle with respect to the horizontal surface.

In this case, as illustrated in FIG. 1 to FIG. 3, an orthogonal coordinate system (X, Y, Z) is used. In the state illustrated in FIG. 1 to FIG. 3, in the orthogonal coordinate system (X, Y, Z), a fore-and-aft direction (depth direction) extending parallel to the main mounting surface 11*a* is defined as a Y-axis direction, a right-and-left direction (width direction) extending parallel to the main mounting surface 11*a* and orthogonal to the Y-axis direction is defined as an X-axis direction, and an up-and-down direction (height direction) orthogonal to the main mounting surface 11*a* is defined as a Z-axis direction.

The cradle device 10 illustrated in the figures is a cradle device capable of, while holding a portable information terminal 40 (see FIG. 4) including a receptacle connector (described later), charging the held portable information terminal through insertion of a plug connector (described later) into the receptacle connector of the held portable information terminal.

In the embodiment illustrated in the figures, the portable information terminal 40 is a tablet terminal (multifunction portable terminal) having a 10-inch screen such as iPad.

Referring to FIG. 4(A) and FIG. 4(D), the portable information terminal 40 has dimensions of a vertical length L, a width W, and a thickness t. In the embodiment illustrated in the figures, the vertical length L is 241.2 mm, the width W is 185.7 mm, and the thickness t is 8.8 mm. Further, as illustrated in FIG. 4(B), the portable information terminal 40 includes a receptacle connector 401 formed in a lower end thereof. Therefore, the portable information terminal 40 has the maximum length and width dimensions twice as large as the minimum length and width dimensions or more.

Referring back to FIG. 1 to FIG. 3, the cradle device 10 includes a battery-charging cover 12 removably fixed to a lower end of the main mounting surface 11*a*. FIG. 1 illustrates a state in which the battery-charging cover 12 is fixed to the lower end of the main mounting surface 11*a*. The battery-charging cover 12 supports the lower end of the above-mentioned portable information terminal 40 to be held on the main mounting surface 11*a*.

Figure 5:
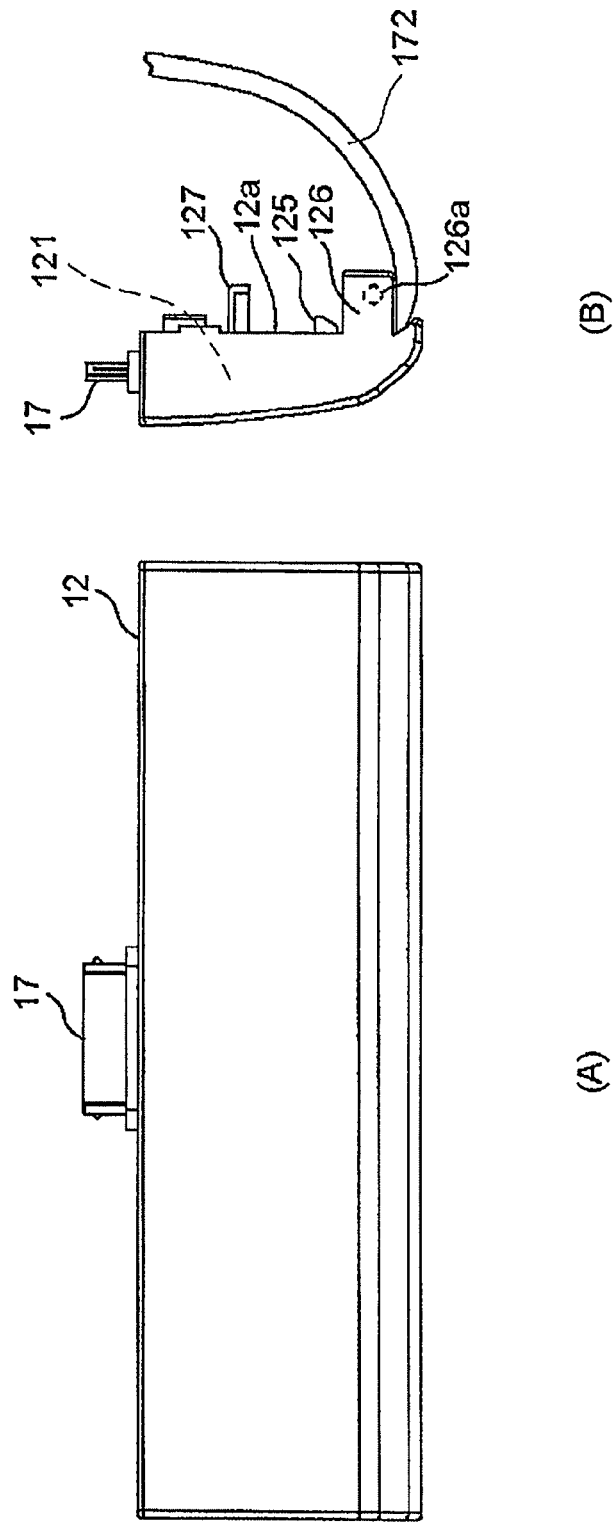
FIG. 5 includes views each illustrating a configuration of the cradle device illustrated in FIG. 1 under a state in which a plug connector is housed in and fixed to a housing section of the battery-charging cover, in which (A) is a front view, and (B) is a right-hand side view.

The plug connector 17 (see FIG. 5) is provided to the portable information terminal 40 as the auxiliary part. The plug connector 17 is fixed to the one end portion of the power supply cable 172.

The battery-charging cover 12 includes a housing section capable of housing the plug connector 17. The battery-charging cover 12 supports the lower end of the portable information terminal 40 to be held on the main mounting surface 11*a*.

The battery-charging cover 12 is rotatable about pivots 126a (see FIG. 5) arranged at the lower end portion thereof.

As illustrated in FIG. 2, a side plate 14 is removably arranged on a right side surface of the body 11.

Note that, the cradle device illustrated in the figures includes, on a left side portion of the body 11, volume buttons 21, a plurality of function buttons 23, an incoming call lamp 25, and a Bluetooth (unregistered or registered trademark) module linking button 27.

The cradle device illustrated in the figures is combined integrally with a call receiver section 60 arranged on a left side surface of the body 11, to thereby serve as a desk telephone 50. The call receiver section 60 includes a handset 62 and a loudspeaker 64.

Next, referring to FIG. 5(A) and FIG. 5(B), when a latching claw (not shown) of a housing section 121 of the battery-charging cover 12 is engaged with a latching hole (not shown) of a pressing plate (not shown), the plug connector 17 is sandwiched between the housing section 121 and the pressing plate to be fixed. In this embodiment, the plug connector 17 is provided to the above-mentioned portable information terminal (tablet terminal) 40 as the auxiliary part.

Figure 4:
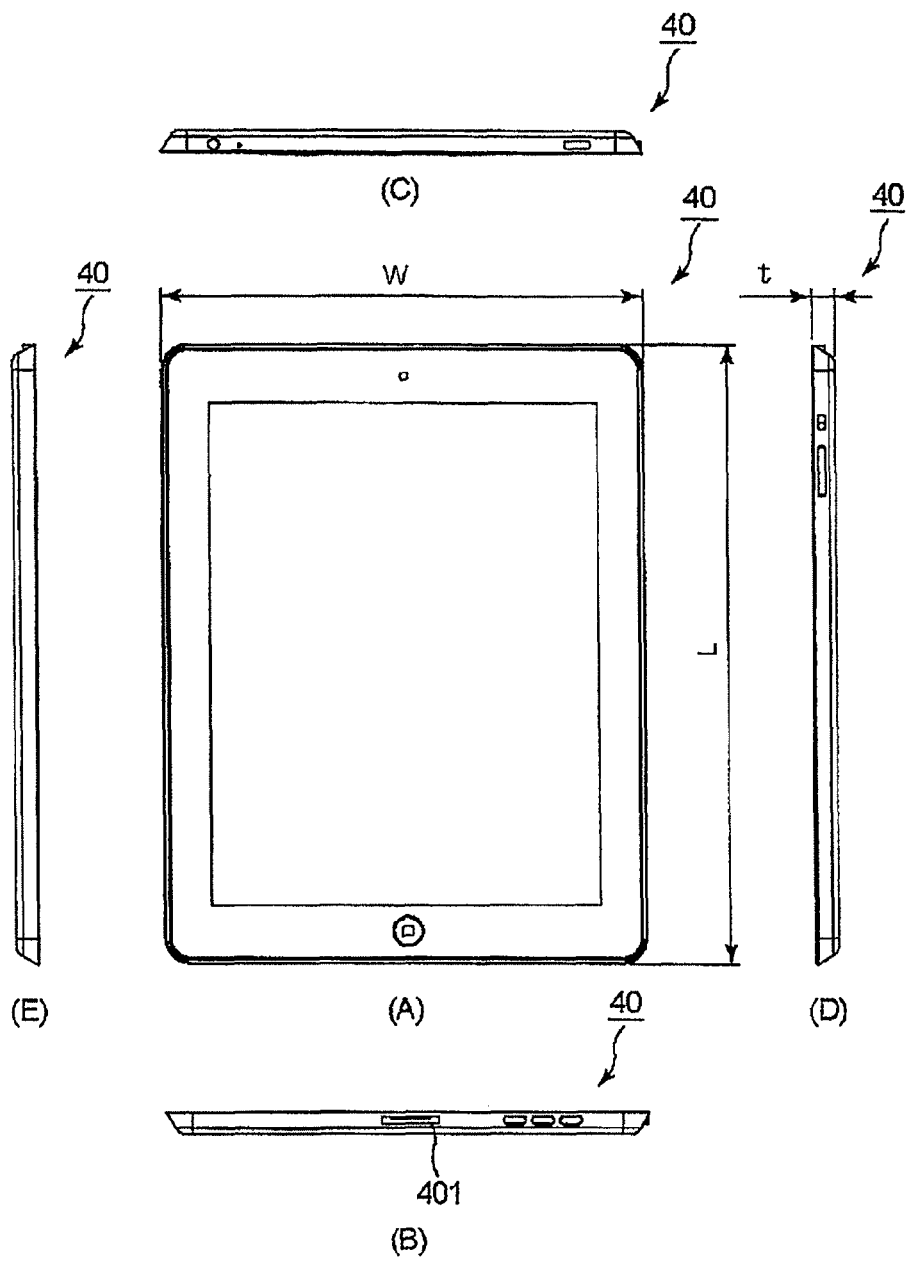
FIG. 4 includes views each illustrating a portable information terminal to be held and charged by the cradle device illustrated in FIG. 1, in which (A) is a front view, (B) is a bottom view, (C) is a top view (plan view), (D) is a right-hand side view, and (E) is a left-hand side view.

The plug connector 17 is connected to a power outlet socket via the power supply cable 172 and an adapter including a plug (not shown). As illustrated in FIG. 4, on the other hand, the portable information terminal 40 includes, at the lower end portion thereof, a receptacle connector 401 (see FIG. 4(B)) into which the plug connector 17 can be inserted. Therefore, when the plug connector 17 is inserted into the receptacle connector 301 of the portable information terminal 40, a secondary battery (lithium ion battery) built into the portable information terminal (tablet terminal) 40 can be charged.

Next, with reference to FIG. 5 to FIG. 8 in addition to FIG. 2, a state in which the battery-charging cover 12 is fixed on the main mounting surface 11a of the body 11 is described.

Figure 6:
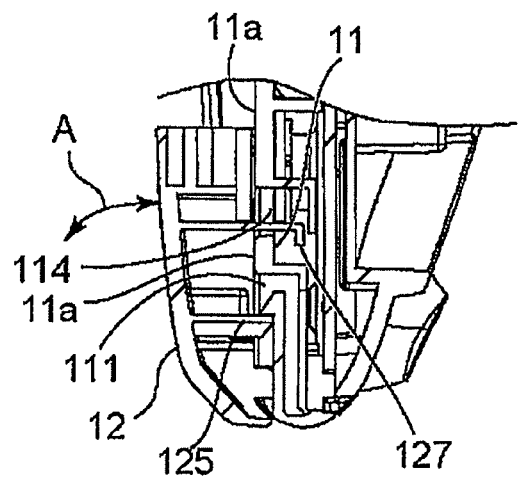
FIG. 6 is a sectional view taken along the line XIII-XIII of FIG. 3.

As illustrated in FIG. 2 and FIG. 6, the body 11 of the cradle device 10 includes, at the lower end portion thereof, a lock claw 111 formed on the main mounting surface 11a. As illustrated in FIG. 5(B) and FIG. 6, on the other hand, the battery-charging cover 12 includes a protruding piece 125 to be engaged with the lock claw 111.

Therefore, in the state in which the battery-charging cover 12 is fixed to the lower end of the main mounting surface 11a of the body 11, as illustrated in FIG. 6, the protruding piece 125 of the battery-charging cover 12 is latched by the lock claw 111 formed on the main mounting surface 11a. When the battery-charging cover 12 in this state is pushed in a horizontal direction toward cushions 15 that are arranged in the X-direction extending parallel to the main mounting surface 11a, the battery-charging cover 12 can be removed from the main mounting surface 11a. On the other hand, when the battery-charging cover 12 is to be fixed to the lower end of the main mounting surface 11a of the body 11, the battery-charging cover 12 can be fixed to the lower end of the main mounting surface 11a of the body 11 through a reverse operation.

Figure 7:
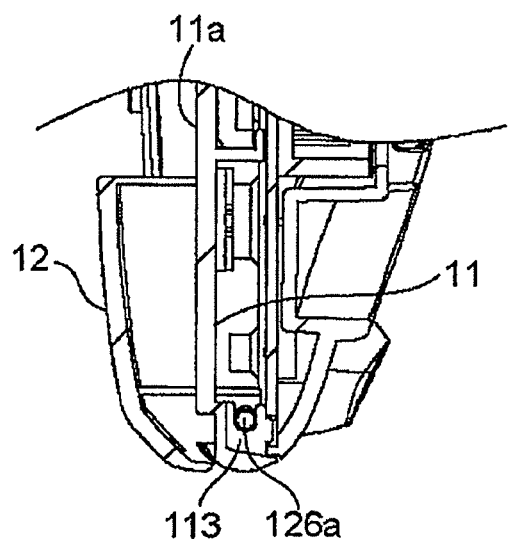
FIG. 7 is a sectional view taken along the line XIV-XIV of FIG. 3.

Further, as illustrated in FIG. 5(B), the battery-charging cover 12 has both side surfaces 126 extending downward on both sides of the lower end portion thereof. A pair of columnar protrusions 126a protruding inward is formed on both the side surfaces 126. As illustrated in FIG. 2, on the other hand, the main mounting surface 11a of the body 11 has a pair of insertion holes 112 formed in the lower end portion thereof so that both the above-mentioned side surfaces 126 of the battery-charging cover 12 are inserted thereinto. Further, as illustrated in FIG. 7, the body 11 has a pair of U-shaped grooves 113 formed in the lower end portion thereof at positions close to the pair of insertion holes 112 (see FIG. 2) so that the above-mentioned pair of columnar protrusions 126a is fitted thereinto.

Therefore, the pair of columnar protrusions 126a to be fitted into the pair of U-shaped grooves 113 acts as the above-mentioned pivots of the battery-charging cover 12.

As illustrated in FIG. 5(B) and FIG. 6, the battery-charging cover 12 includes a pair of stoppers 127 protruding downward from an inner wall at a center portion of the battery-charging cover 12. As illustrated in FIG. 2, on the other hand, the main mounting surface 11a of the body 11 has a pair of through holes 114 formed in the lower end portion thereof so that the pair of stoppers 127 passes therethrough. Therefore, as illustrated in FIG. 6, the range of rotation of the battery-charging cover 12 about the above-mentioned pivots (pair of columnar protrusions) 126a is limited by the pair of stoppers 127 to a range within a predetermined angle indicated by the arrow A of FIG. 6. In other words, the pair of stoppers 127 limits, in cooperation with the body 11, the range of rotation of the battery-charging cover 12 about the pivots 126a to the range within the predetermined angle.

Figure 8:
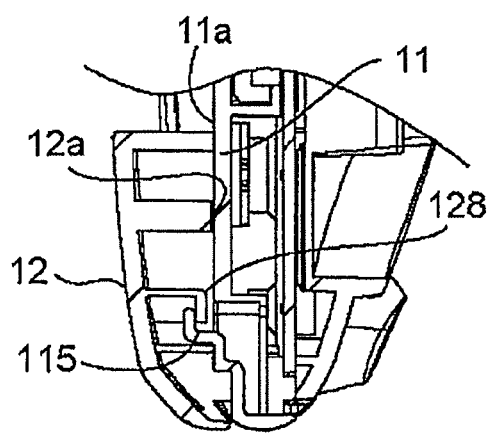
FIG. 8 is a sectional view taken along the line XV-XV of FIG. 3.

As illustrated in FIG. 8, the battery-charging cover 12 includes a hook 128 protruding toward the main mounting surface 11a of the body 11. As illustrated in FIG. 2 and FIG. 8, on the other hand, the body 11 includes, at the lower end portion thereof, an elastic hook 115 protruding from the main mounting surface 11a toward the battery-charging cover 12 and engageable with the hook 128. Therefore, the combination of the hook 128 and the elastic hook 115 acts as an urging mechanism (128, 115) configured to urge the battery-charging cover 12 so that a back surface 12a of the battery-charging cover 12 returns to an initial position in contact with the main mounting surface 11a of the body 11.

Figure 9:
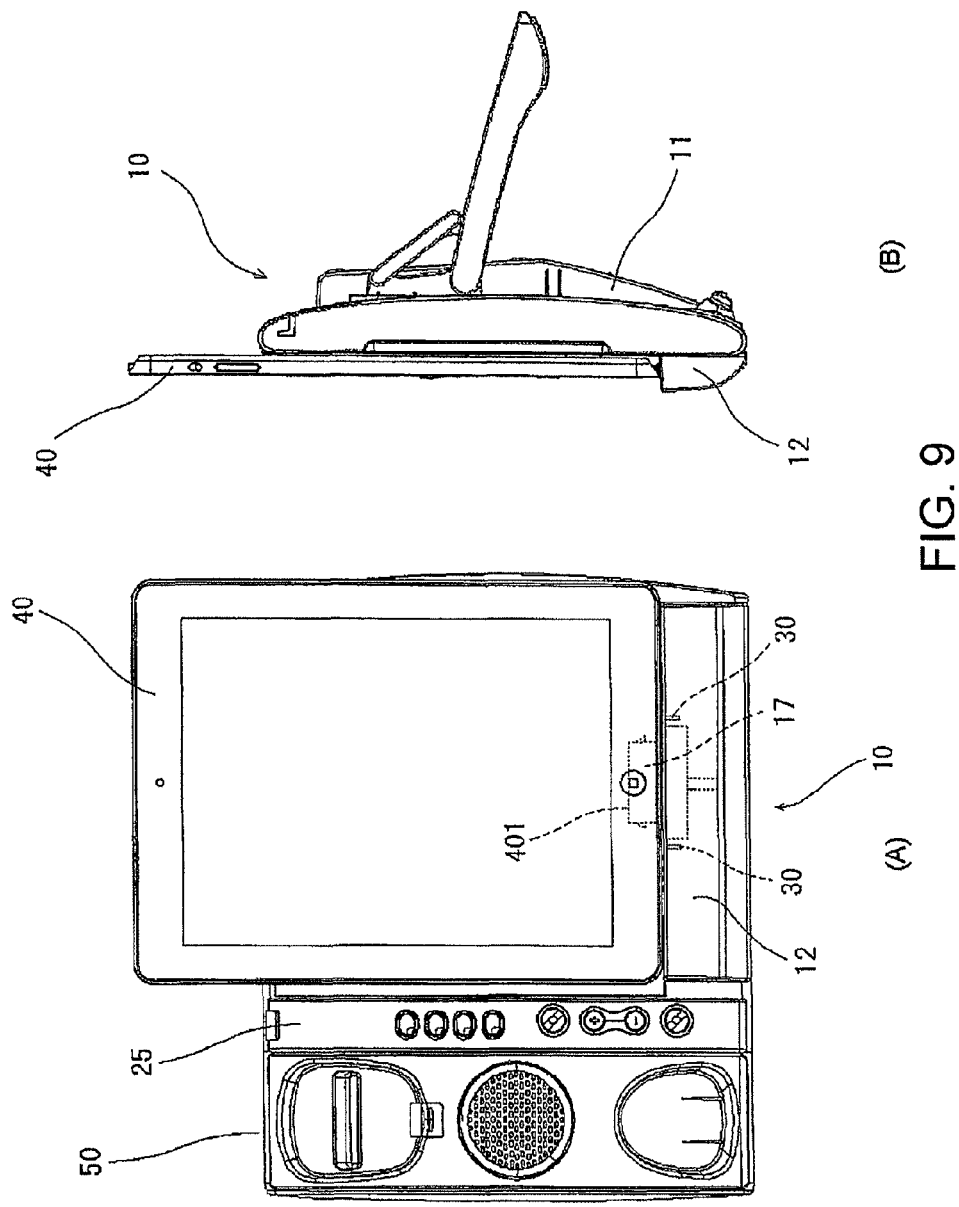
FIG. 9 includes views each illustrating a configuration of the cradle device illustrated in FIG. 3 under a state in which the plug connector is housed in the battery-charging cover and the portable information terminal is supported, in which (A) is a front view, and (B) is a right-hand side view.

Referring to FIG. 9(A) and FIG. 9(B), the cradle device 10 is a device configured to removably support the portable information terminal 40 including the battery-charging receptacle connector 401 formed in the lower end thereof, and allow the battery-charging plug connector 17, which is supposed to be fitted into the receptacle connector 401 of the supported portable information terminal 40, to be fitted into the receptacle connector 401. The cradle device 10 includes the body 11 and the battery-charging cover 12. The body 11 has the main mounting surface 11a inclined backward on the upper side to support the back surface of the portable information terminal 40.

The battery-charging cover 12 houses the plug connector 17 so that the tip of the plug connector 17 protrudes from the upper end of the battery-charging cover 12 and is rotatable forward about the pivots 126a (see FIG. 5(B), FIG. 7) arranged at the lower end of the main mounting surface 11a.

The upper end of the battery-charging cover 12 supports the lower end of the portable information terminal 40 to be held on the main mounting surface 11a.

When the lower end of the portable information terminal 40 is supported by the upper end of the battery-charging cover, the plug connector 17 is fitted into the receptacle connector 401 in the fitting direction. Specifically, the user mounts the portable information terminal 40 on the cradle device 10 in such a manner that the portable information terminal 40 is leaned against the main mounting surface 11a, and then the portable information terminal 40 slides down on the cushions 15 of the main mounting surface 11a under its own weight. As a result, the lower end of the portable information terminal 40 is supported by the upper end surface of the battery-charging cover 12, and at the same time, the plug connector 17 is fitted into the receptacle connector 401 to complete electrical connection.

In particular, in the cradle device 10, the body 11 includes the ribs 30 arranged at the lower end of the main mounting surface 11a. The ribs 30 are formed of a pair of rib pieces arranged at positions corresponding to both sides of the plug connector 17.

On the other hand, although not shown, a notch that allows the ribs 30 to protrude as well as a notch for protruding the tip of the plug connector 17 are formed in the upper end surface of the battery-charging cover 12.

Figure 10:
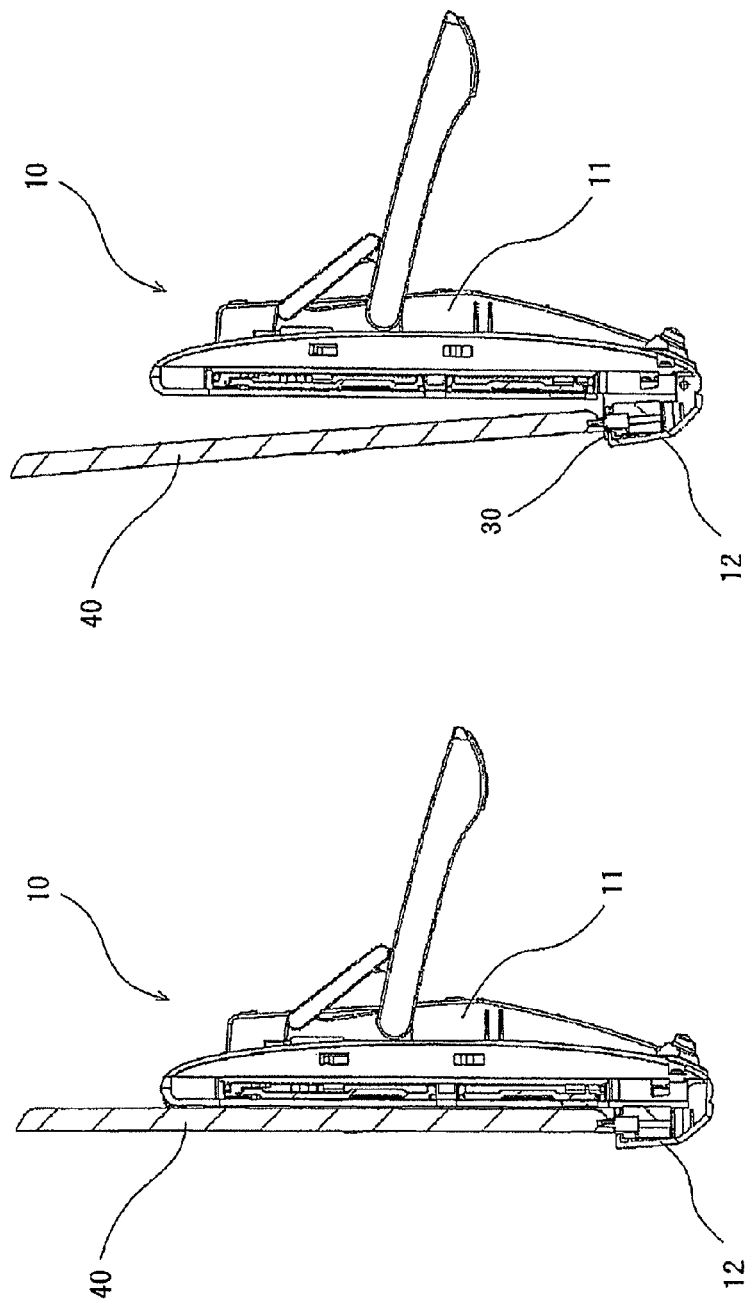
FIG. 10 includes views each illustrating an operation of the cradle device according to the embodiment of this invention, (A) being a sectional view illustrating a state in which the portable information terminal is supported, (B) being a sectional view illustrating a state in which the battery-charging cover is opened.
Figure 11:
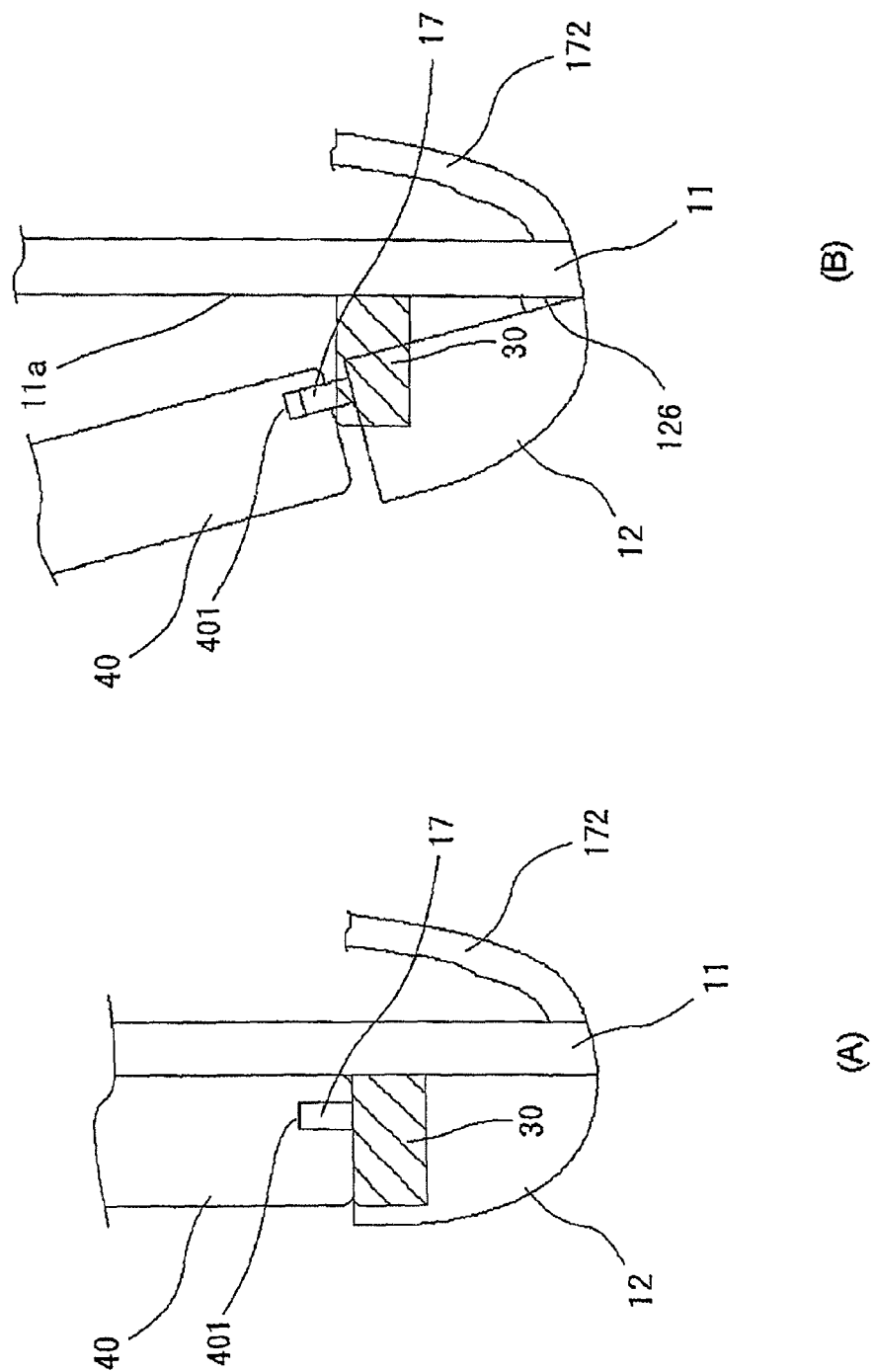
FIG. 11 includes views each illustrating the operation of the cradle device according to the embodiment of this invention, (A) being a conceptual sectional view partially illustrating the state in which the portable information terminal is supported, (B) being a conceptual sectional view partially illustrating the state in which the battery-charging cover is opened.

Therefore, the ribs 30 relatively project from the upper end surface of the battery-charging cover 12 gradually along with the forward rotation of the battery-charging cover 12 through the operation by the user. As a result, the portable information terminal 40 supported on the upper end surface of the battery-charging cover 12 as illustrated in FIG. 10(A) and FIG. 11(A) is gradually raised by the ribs 30 from the upper end surface of the battery-charging cover 12 as illustrated in FIG. 10(B) and FIG. 11(B). In this way, the plug connector 17 is automatically extracted from the receptacle connector 401 in the fitting direction.

Note that, as illustrated in FIG. 11(A) and FIG. 11(B), a round surface or a chamfered portion having a predetermined size is formed on an upper forward corner portion of each of the ribs 30. With this configuration, the ribs 30 neither bump into the lower end surface of the portable information terminal 40 nor damage the lower end surface when projecting from the upper end surface of the battery-charging cover 12 gradually, and hence the portable information terminal 40 is gradually raised in a smooth manner.

In the cradle device 10 of this embodiment, when the portable information terminal 40 supported by the cradle device 10 is removed, the plug connector 17 is automatically extracted from the receptacle connector 401 in the fitting direction along with the rotation of the battery-charging cover 12 through the operation by the user. Therefore, the user needs not to perform work involving holding down the cradle device 10 on a desk or the like, and pulling the portable information terminal 40 while moving the portable information terminal 40 from side to side. Thus, the cradle device 10 has excellent usability.

Further, the plug connector 17 is extracted from the receptacle connector 401 in the fitting direction, and hence a load (stress) in a direction different from the connector fitting direction is not applied on the plug connector 17 and the receptacle connector 401. Therefore, there is no fear that the receptacle connector 401 and the plug connector 17 are deformed and damaged. Thus, the cradle device 10 has high reliability of electrical connection.

In addition, the cradle device 10 has the structure in which only the fixed ribs are added to the cradle device including the rotatable battery-charging cover without the need to provide a spring and a rotational component. Thus, the cradle device 10 has a simple structure.

INDUSTRIAL APPLICABILITY

While this invention has been described with reference to the embodiment, various modifications that can be understood by a person skilled in the art may be made to the configuration and details of this invention.

Further, this application is based on and claims the benefit of priority from Japanese Patent Application No. 2012-212075, filed on Sep. 26, 2012, the disclosure of which is incorporated herein by reference in its entirety.

The invention claimed is:

1. A cradle device configured to removably support a portable information terminal including a receptacle connector formed in a lower end thereof, and to allow fitting between the receptacle connector of the supported portable information terminal and a plug connector to be fitted into the receptacle connector, the cradle device comprising: a body comprising a main mounting surface inclined backward on an upper side thereof to support a back surface of the portable information terminal; and a battery-charging cover configured to house the plug connector so that a tip of the plug connector protrudes from an upper end of the battery-charging cover, and to be rotatable forward about pivots arranged at a lower end of the main mounting surface and away from the main mounting surface, the upper end of the battery-charging cover being configured to support the lower end of the portable information terminal to be held on the main mounting surface, the plug connector being configured to be fitted into the receptacle connector in a fitting direction when the lower end of the portable information terminal is supported by the upper end of the battery-charging the ribs being configured to relatively project from the upper end of the battery-charging cover gradually along with the forward rotation of the battery-charging cover so that the portable information terminal is gradually raised from the upper end of the battery-charging cover, to thereby extract the plug connector from the receptacle connector in the fitting direction cover, the body further comprising ribs arranged at the lower end of the main mounting surface, the ribs being configured to relatively project from the upper end of the battery-charging cover gradually along with the forward rotation of the battery-charging cover so that the portable information terminal is gradually raised from the upper end of the battery-charging cover, to thereby extract the plug connector from the receptacle connector in the fitting direction.

2. The cradle device according to claim 1, wherein the ribs comprise a pair of rib pieces arranged at the lower end of the main mounting surface at positions corresponding to both sides of the plug connector.

3. The cradle device according to claim 1, wherein the pivots comprise a pair of columnar protrusions that is arranged on both sides of the battery-charging cover and is to be fitted into a pair of U-shaped grooves formed in the body.

4. The cradle device according to claim 1, wherein the battery-charging cover comprises a stopper configured to limit, in cooperation with the body, a range of rotation of the battery-charging cover about the pivots to a range within a predetermined angle.

5. The cradle device according to claim 1, further comprising an urging mechanism configured to urge the battery-charging cover so that a back surface of the battery-charging cover returns to an initial position in contact with the main mounting surface.

6. A desk telephone, comprising:
the cradle device according to claim 1; and
a handset arranged on a side portion of the body.

* * * * *